(12) United States Patent
Fang et al.

(10) Patent No.: US 12,349,016 B2
(45) Date of Patent: Jul. 1, 2025

(54) DATA COLLECTION AND PERFORMANCE ENHANCEMENT FOR COMMUNICATION NETWORK

(71) Applicant: ZTE Corporation, Guangdong (CN)

(72) Inventors: Jianmin Fang, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 342 days.

(21) Appl. No.: 17/820,340

(22) Filed: Aug. 17, 2022

(65) Prior Publication Data

US 2023/0144788 A1 May 11, 2023

Related U.S. Application Data

(63) Continuation of application No. PCT/CN2020/075823, filed on Feb. 19, 2020.

(51) Int. Cl.
*H04W 36/00* (2009.01)
*H04W 74/08* (2024.01)
*H04W 74/0833* (2024.01)

(52) U.S. Cl.
CPC ... *H04W 36/0079* (2018.08); *H04W 36/0061* (2013.01); *H04W 36/00837* (2018.08); *H04W 74/0841* (2013.01)

(58) Field of Classification Search
CPC ......... H04W 36/0079; H04W 36/0061; H04W 36/00837; H04W 74/0841; H04W 24/10; H04W 24/02; H04W 52/0229; H04W 28/0263; H04W 76/18; Y02D 30/70
USPC ................................................. 370/331–332
See application file for complete search history.

(56) References Cited

U.S. PATENT DOCUMENTS

| | | | |
|---|---|---|---|
| 2011/0116364 A1 | 5/2011 | Zhang et al. | |
| 2017/0019887 A1 | 1/2017 | Jiang et al. | |
| 2020/0022035 A1 | 1/2020 | Kadiri et al. | |
| 2021/0211956 A1* | 7/2021 | Kim | H04W 36/0079 |
| 2022/0264680 A1* | 8/2022 | Kim | H04W 76/15 |

(Continued)

FOREIGN PATENT DOCUMENTS

| | | |
|---|---|---|
| CN | 106211230 A | 12/2016 |
| CN | 109526029 A | 3/2019 |

(Continued)

OTHER PUBLICATIONS

Co-Pending EP Application No. 20887613.6, Extended European Search Report, dated Feb. 15, 2024, 21 pages.

(Continued)

*Primary Examiner* — Candal Elpenord
(74) *Attorney, Agent, or Firm* — Perkins Coie LLP

(57) ABSTRACT

Techniques are described to improve performance of a wireless network and/or devices within the wireless network. For example, a wireless communication method comprises receiving, by a communication node at a first time, one or more delay values, where each delay value is indicative of amount of time by which a measurement is to be delayed, and performing the measurement at or after a third time, where the third time is based on a delay value from the one or more delay values and a second time when the communication node enters an idle state or an inactive state, where the first time precedes the second time in time, and where the second time precedes the third time in time.

20 Claims, 20 Drawing Sheets

(56) References Cited

U.S. PATENT DOCUMENTS

2022/0400415 A1* 12/2022 Xie .................. H04W 36/0079
2023/0103126 A1* 3/2023 Liu .................. H04W 36/0079
                                                        370/311

FOREIGN PATENT DOCUMENTS

| WO | 2018/175721 | | 9/2018 |
| WO | 2019060197 | A1 | 3/2019 |
| WO | 2019/137453 | | 7/2019 |

OTHER PUBLICATIONS

OPPO "on-DAPS DRB handling upon DAPS HO failure" 3GPP TSG-RAN WG2 Meeting#109 electronic Feb. 24-Mar. 6, 2020, R2-2000656, 2 pages.

Nokia et al., "On RLF reporting for CHO and DAPS" 3GPP TSG-RAN WG2 Meeting #108 Reno, USA, Nov. 18-22, 2019, R2-1915497, 3 pages.

CATT "Output of Email Discussion [107#45][NRSON] RACH and Mobility Robustness Optimisation Checking" 3GPP TSG-RAN WG2 Meeting #107bis Chongqing, P.R.China, Oct. 14-18, 2019, R2-1912147, 38 pages.

ISA, International Search Report and Written Opinion for International Application No. PCT/CN2020/075823, Mail Date Nov. 10, 2020. 9 pages.

Co-Pending Indian Application No. 202247045256, Indian First Examination Report dated Jan. 10, 2023, 8 pages.

Co-Pending EP Application No. 20887613.6, Rule 63(1) Communication, dated Sep. 27, 2023, 5 pages.

Co-Pending CN Application No. 2020800972257, First Office Action, dated Feb. 28, 2024, 18 pages with Google translation.

* cited by examiner

1310

1312 — Transmitting a report to a network node in response to an occurrence of a failure of a secondary cell group (SCG), wherein the report includes an indication of the failure of the SCG and a state of the primary SCG cell (PSCell) when the failure occurred

FIG. 13B

DATA COLLECTION AND PERFORMANCE ENHANCEMENT FOR COMMUNICATION NETWORK

CROSS-REFERENCE TO RELATED APPLICATION

This application is a continuation and claims priority to International Application No. PCT/CN2020/075823, filed on Feb. 19, 2020, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for data collection and/or performance enhancement of a wireless network. A wireless network configuration can be optimized by analyzing the related data reported by a user equipment (UE) or base station (RAN node) to enhance the performance of the wireless network.

A first wireless communication method comprises receiving, by a communication node at a first time, one or more delay values, where each delay value is indicative of amount of time by which a measurement is to be delayed, and performing the measurement at or after a third time, where the third time is based on a delay value from the one or more delay values and a second time when the communication node enters an idle state or an inactive state, where the first time precedes the second time in time, and where the second time precedes the third time in time.

In some embodiments, the one or more delay values includes a first delay value associated with the idle state and a second delay value associated with the inactive state. In some embodiments, the one or more delay values includes a first delay value based on an amount of time the communication node spends in the idle state or in an connected state, and the one or more delay values includes a second delay value based on a second amount of time the communication node spends in the inactive state or in the connected state.

In some embodiments, the first wireless communication method further comprises transmitting, to a network node, the delay value and/or a second time value indicative of a second amount of time within which the measurement is to be performed, where the delay value or the second time value is transmitted after the communication node enters a connected state or an active state, and where the delay value and/or the second time value are sent in response to a result of the measurement being invalid.

A second wireless communication method comprises transmitting a report to a network node in response to an occurrence of a failure of a secondary cell group (SCG), where the report includes an indication of the failure of the SCG and a state of the primary SCG cell (PSCell) when the failure occurred. In some embodiments, the state of the PSCell indicates whether the PSCell is operating on a dormant bandwidth part (BWP). In some embodiments, the network node includes a master node (MN).

A third wireless communication method comprises receiving, by a first network node, a report from a communication node, where the report is received in response to an occurrence of a failure of a secondary cell group (SCG), and where the report includes an indication of the failure of the SCG and a state of the primary SCG cell (PSCell) when the failure occurred, and transmitting the report to a second network node.

In some embodiments, the state of the PSCell indicates whether the PSCell is operating on a dormant bandwidth part (BWP). In some embodiments, the first network node includes a master node (MN), and where the second network node includes a secondary node (SN).

A fourth wireless communication method comprises transmitting, to a first network node, a mobility enhancement related information in response to an occurrence of a mobility failure when transitioning from a second network node to a third network node, where the mobility enhancement related information includes: a Dual Active Protocol Stack (DAPS) related information, a Conditional Primary secondary cell group cell Addition or Change (CPAC) failure information, a Conditional Handover (CHO) failure cause information, or a successful handover related information.

In some embodiments, the DAPS related information includes a Packet Data Convergence Protocol (PDCP) type and/or an indication whether a maximum number of aggregated carriers are reached. In some embodiments, the CHO failure cause information includes an integrity protection failure or an invalid abstract syntax notation (ASN.1). In some embodiments, the successful handover related information includes a handover type and/or a two-step Random Access Channel (RACH) related information. In some embodiments, the CPAC failure indication indicates whether a conditional Primary Secondary cell group Cell (PSCell) change is triggered by a master node or a secondary node.

A fifth wireless communication method comprises transmitting, by a network node to a network, a usage related information for a user equipment (UE) assistant information received from a UE, where the usage related information indicates whether the network node received or used the UE assistant information and/or metrics associated with the UE assistant information, where the UE assistant information includes one or more parameters and one or more corresponding values for each parameter collected by the UE for network performance enhancement, and where the usage related information includes: an indication whether the network node received the UE assistant information, an indication whether the network node used the UE assistant information, a result of the network node using the UE assistant information, a number of records of the UE assistant information that the network node has received, a number of records of the UE assistant information that the network node has used, a list of types of the UE assistant information that the network node has received, a list of types of the UE assistant information that the network node has used, a number of records of the UE assistant information that the network node has received per each type of the UE assistant information, a number of records of the UE assistant information that the network node has used per each type of the UE assistant information, a result of the network node using UE assistant information per type of the UE assistant information, a number of user equipment from which the network node has received the UE assistant information, a number of user equipment from which the network node has received and used the UE assistant information, a number of user equipment from which the network node has received the UE assistant information per each type of the UE assistant information, or a number of user equipment from which the network node has received and used the UE assistant information per each type of the UE assistant information.

In some embodiments, the network includes a core network, a Trace Collection Entity (TCE), or an Operation Administration and Maintenance (OAM).

A sixth wireless communication method comprises transmitting, by a network node to a network, a requirement or a forecast for a quality of service (QoS) flow sent by a communication node, and receiving, after the transmitting and from the network, a QoS parameter for the QoS flow, where the QoS parameter includes: an indicator that a QoS requirement of the QoS flow has changed over time, or a list of one or more QoS parameters to be used by the communication node for the Qos flow.

In some embodiments, the sixth wireless communication method further comprises mapping the QoS flow to a list of one or more data radio bearers (DRBs) based on the QoS parameter. In some embodiments, the network node switches the mapping of the QoS flow from a first DRB from the list of one or more DRBs to a second DRB from the list of one or more DRBs. In some embodiments, the network includes a core network or an application server.

A seventh wireless communication method comprises receiving, by a network, a requirement or a forecast for a quality of service (QoS) flow sent by a communication node; and transmitting, after the receiving, a QoS parameter for the QoS flow, where the QoS parameter includes: an indicator that a QoS requirement of the QoS flow has changed over time, or a list of one or more QoS parameters to be used by the communication node for the Qos flow.

In some embodiments, the network receives the requirement or the forecast for the QoS flow directly from the communication or from a network node. In some embodiments, the network includes a core network or an application server.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 13B shows an exemplary flowchart for transmitting a report in response to an occurrence of a SCG failure.

DETAILED DESCRIPTION

Figure 1:
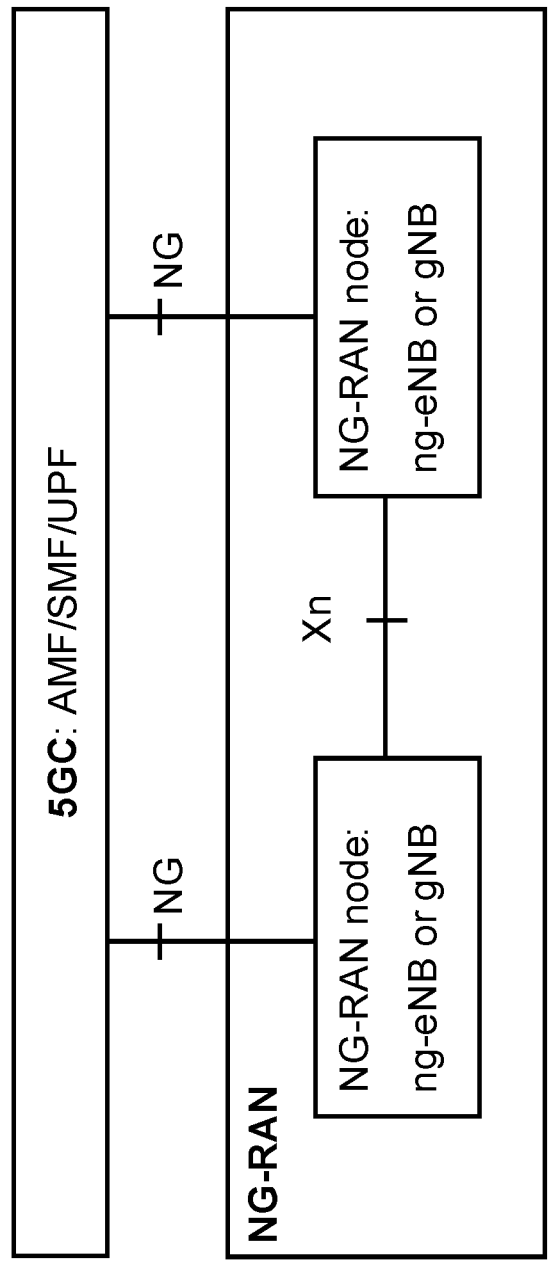
FIG. 1 illustrates an example 5G network architecture.

FIG. 1 illustrates an example 5G network architecture. As shown in FIG. 1, a fifth generation (5G) network architecture may include a 5G core network (5GC) and a next generation radio access network (NG-RAN).

The 5GC may include any of an Access Mobility Function (AMF), a Session Management Function (SMF), and a User Plane Function (UPF). NG-RAN may include base stations with different radio access technologies (RATs), such as an evolved 4G base station (ng-eNB), a 5G base station (gNB). The NG-RAN base station may be connected to the 5GC through the NG interface, and the NG-RAN base stations may be connected through the Xn interface.

Figure 2:
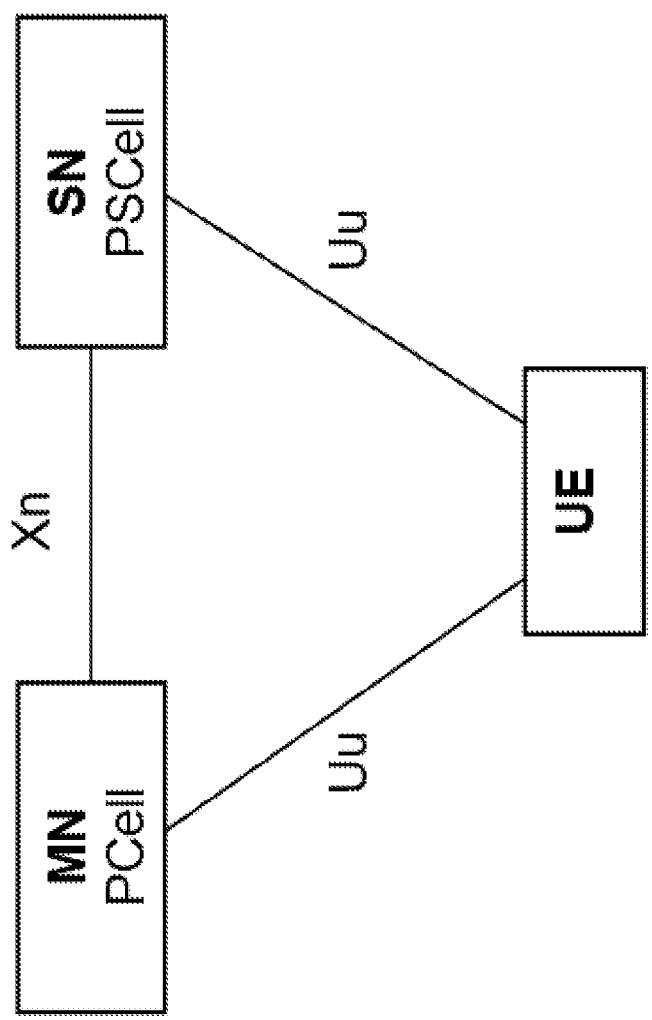
FIG. 2 illustrates a Dual Connectivity (DC) schematic.

FIG. 2 illustrates a Dual Connectivity (DC) schematic. As shown in FIG. 2, various networks (e.g., 4G and 5G systems) may support Dual Connectivity (DC) functionality. A DC enabled UE may remain connection simultaneously with two base stations, where a first base station may be a Master Node (MN), and a second base station is a Secondary Node (SN). Participation of a DC enabled cell located at MN may include a Master Cell Group (MCG) including a Primary Cell (PCell), and the secondary station may include a secondary cell group (SCG) including a primary SCG Cell (PSCell). The base station and the terminal UE may be connected through a Uu air interface.

Figure 3:
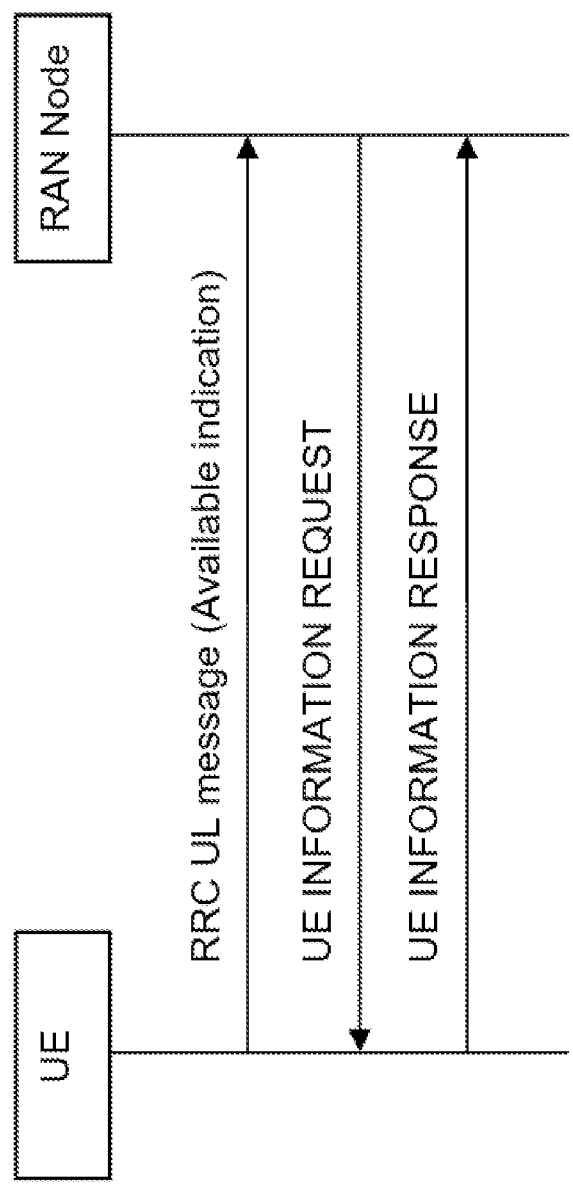
FIG. 3 shows a measurement reporting signaling procedure.

FIG. 3 illustrates a signaling procedure for measurement reporting. The UE may provide a RAN node (e.g., base station) measurement result reporting information. As shown in FIG. 3, the UE may send RRC uplink message to the RAN node. The RRC uplink message may include an available indication. The RAN node may send a UE information request message to the UE. The UE may transmit a UE information response message to the RAN node in response to receiving the UE information request.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Example Techniques for Early Measurement

Currently, a timer T331 is configured for early measurement, when UE enters into RRC_IDLE or RRC_INACTIVE state, UE may start performing early measurement and start timer T331, UE will stop performing early measurement when timer T331 expired. However, in case UE enters into RRC_CONNECTED state relatively later, if the timer T331 is short, the early measurement result may be invalid since the timer T331 may have expired, while if the timer T331 is long, UE may perform early measurement for a quite long time and cost more UE battery consumption. The UE may perform early measurement by measuring, for example, parameters (e.g., reference signal receiving power (RSRP), reference signal receiving quality (RSRQ), etc.,) for signal(s) received from one or more base stations.

In the example techniques described in Section I, a delay time is introduced, if received, UE starts performing early measurement after a time according to the delay time (e.g., UE does not start performing early measurement immediately when entering into RRC_IDLE or RRC_INACTIVE state). Such a delay measurement technique can enable reasonable UE battery consumption. In some embodiments, a base station can configure the delay time to have a first time value for RRC_IDLE state and a second different time value for RRC_INACTIVE state. In some embodiments, the delay time can be different based on UE behavior as determined by a base station. For example, if a base station determines that a UE spends a significant amount of time (e.g., amount of time greater than a pre-determined limit) in RRC_IDLE or RRC_INACTIVE states over a pre-determined time period, then the base station can configure the delay time for that UE to be longer than a pre-determined time value. In another example, if a base station determines that a UE spends a significant amount of time in connected (or active) state over a pre-determined time period, then the base station can configure the delay time for that UE to be shorter than a pre-determined time value. Thus, the delay time can be configured according to a typical minimum time that the UE stays in idle state, inactive state, or connected state, where the typical minimum time can be determined by the RAN node using statistics related to an amount of time that UE stays in idle, inactive, and/or connected states.

Further, when UE enters into RRC_CONNECTED state, and if UE considers the early measurement result is invalid, UE records the value of the delay time and/or the value of the timer T331, and reports (or transmits) the value of the delay time and/or the value of the timer T331 to base station, to enable optimizing the configuration for the delay time and/or the timer T331. The example techniques for early measurement are further described in Example Embodiments I.1 to I.2 below.

Example Embodiment I.1

Figure 4:
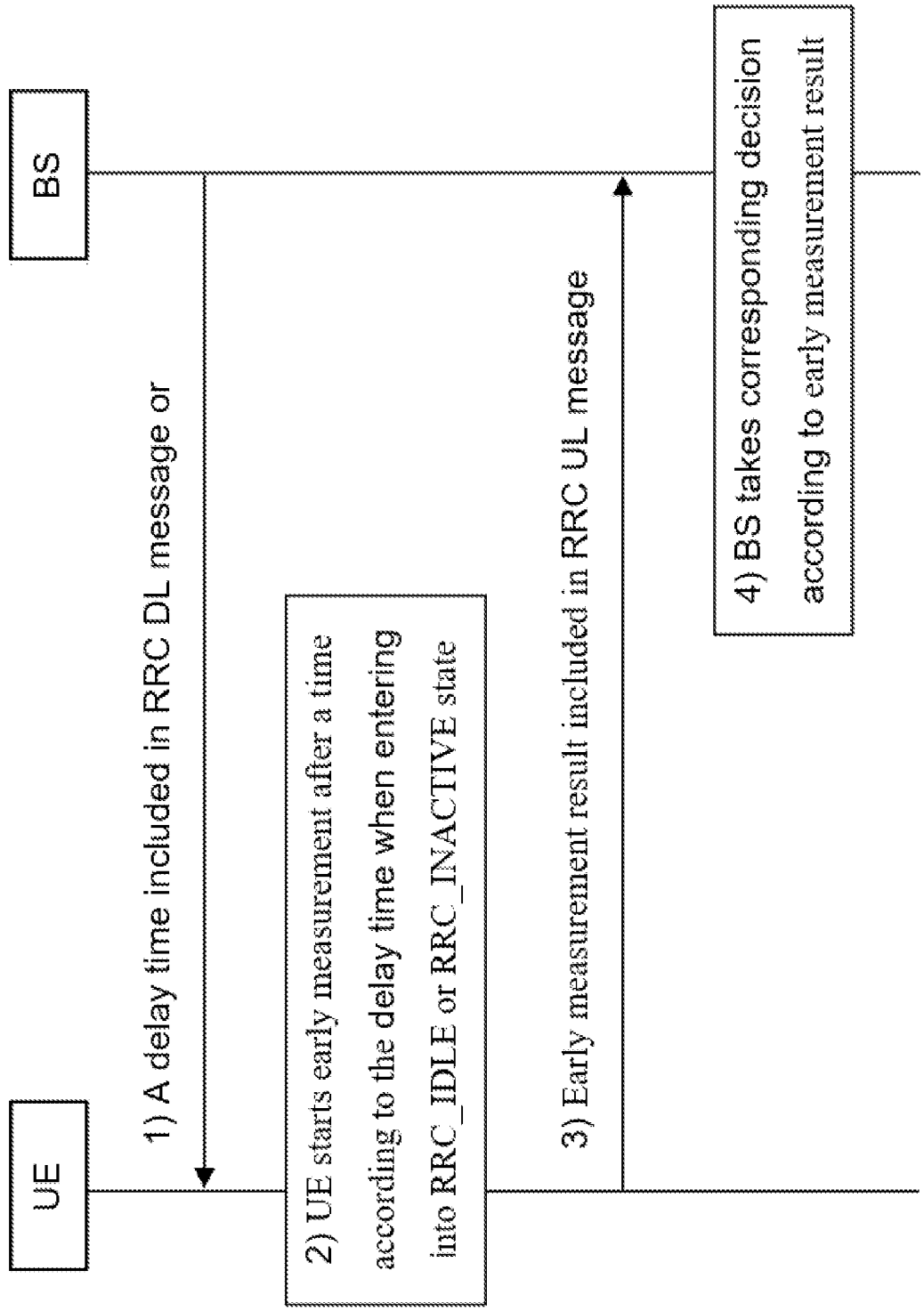
FIG. 4 illustrates an example signaling procedure for early measurement.

FIG. 4 illustrates an example signaling procedure for early measurement corresponding to this example embodiment.

Step 1: Base station sends a RRC DL message (e.g. RRCRelease) to UE including a delay time, or base station broadcasts a delay time.

Step 2: UE obtains the delay time via receiving RRC DL message (e.g. RRCRelease) or via receiving broadcast. When UE enters into RRC_IDLE or RRC_INACTIVE state, UE starts performing early measurement after a time according to the delay time. At Step 2, the UE does not start performing early measurement immediately when entering into RRC_IDLE or RRC_INACTIVE state. UE starts timer T331 when starting to perform early measurement and UE stops performing early measurement when the UE determines that timer T331 expires.

Step 3: UE enters into RRC_CONNECTED state, UE sends early measurement result included in RRC UL message to base station if UE considers the early measurement result is valid (UE may consider the early measurement result is invalid, e.g. when the timer T331 has expired or the measurement is stopped too early before the UE enters the connected state).

Step 4: Base station takes corresponding decision according to the early measurement result (e.g. performing DC and/or CA immediately).

Example Embodiment I.2

Figure 5:
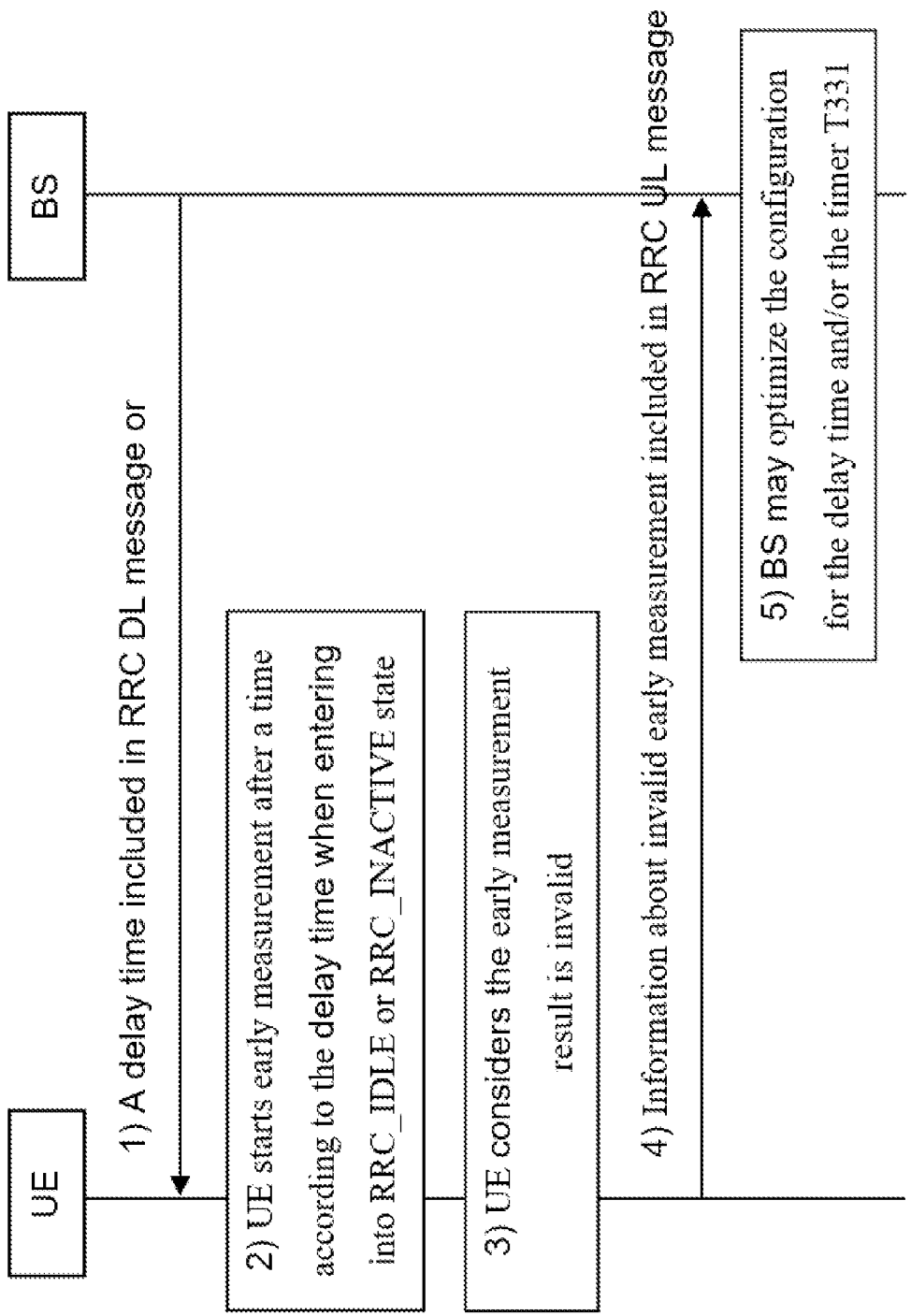
FIG. 5 illustrates an example signaling procedure for data collection for an invalid early measurement.

FIG. 5 illustrates an example signaling procedure for data collection for an invalid early measurement corresponding to this example embodiment.

Step 1: Base station sends a RRC DL message (e.g. RRCRelease) to UE including a delay time, or base station broadcasts a delay time.

Step 2: UE obtains the delay time via receiving RRC DL message (e.g. RRCRelease) or via receiving broadcast. When UE enters into RRC_IDLE or RRC_INACTIVE state, UE starts performing early measurement after a time according to the delay time. At Step 2, the UE does not start performing early measurement immediately when entering into RRC_IDLE or RRC_INACTIVE state. UE starts timer T331 when starting to perform early measurement and the UE stops performing early measurement when the UE determines that timer T331 expires.

Step 3: UE enters into RRC_CONNECTED state, UE considers the early measurement result is invalid since the timer T331 has expired. UE records the value of the delay time and/or the value of the timer T331.

Step 4: UE reports the information about invalid early measurement including the recorded value of the delay time and/or the value of the timer T331 to base station via RRC UL message (e.g. UE INFORMATION RESPONSE message). Before that, UE may send an available indication included in RRC UL message to base station to indicate there are available information about invalid early measurement to be reported.

Step 5: Base station may optimize the configuration for the delay time and/or the timer T331 based on the received information about invalid early measurement.

II. Example Techniques for Dormant BWP

Currently, the concept of dormancy bandwidth part (BWP) is introduced mainly for saving UE battery consumption, and can be quickly switched to normal BWP for data transmission. When SCG failure occurs, UE sends a SCG failure information message to base station to indicate a SCG failure.

In the example techniques described in Section II, a PSCell state (e.g. whether PSCell being on dormancy BWP) is introduced, and reported to base station (e.g. included in SCG failure information message) to enable optimizing the configuration for dormancy BWP, since the frequency resource configured for dormancy BWP and for normal BWP are different, and a SCG failure also may be occurred when PSCell is being on dormancy BWP. A technical benefit of including the PSCell state in the SCG failure information message is that it can enable the base station to determine whether a UE experiences failure when switching between dormancy BWP mode and normal state. For example, if the base station determines that the UE experiences a number of failure when switching between dormancy BWP mode and normal state that is greater than a pre-determined value, the base station may not instruct the UE to enter dormancy BWP mode. The example technique for dormancy BWP is further described in Example Embodiment II.1 below.

Example Embodiment II.1

Figure 6:
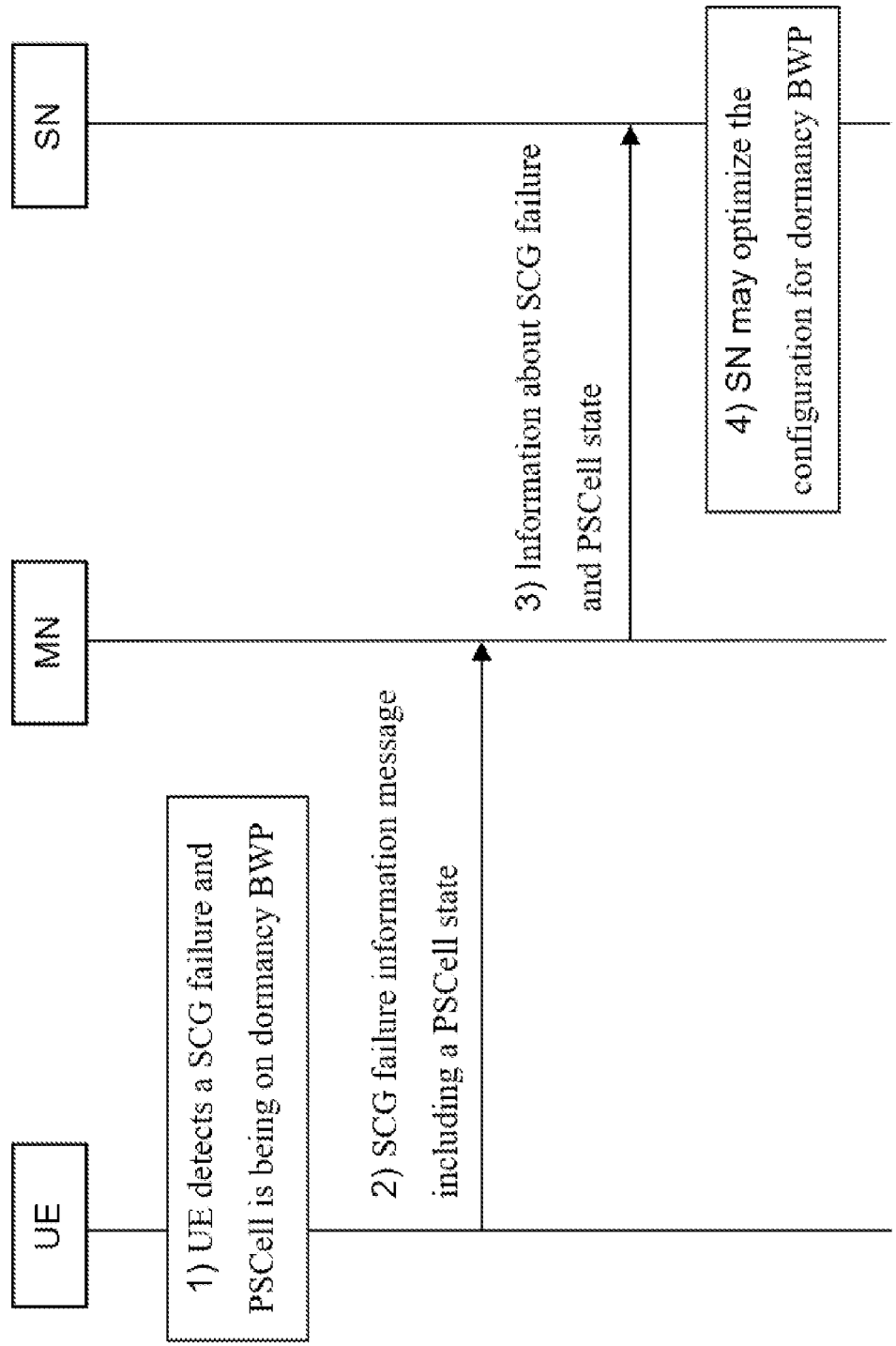
FIG. 6 illustrates an example signaling procedure for data collection for secondary cell group (SCG) failure and primary SCG Cell (PSCell) being on dormancy Bandwidth Part (BWP).

FIG. 6 illustrates an example signaling procedure for data collection for SCG failure and PSCell being on dormancy BWP corresponding to this example embodiment.

Step 1: UE detects a SCG failure and determines that PSCell is being on or operates on dormancy BWP.

Step 2: UE sends a SCG failure information message including a PSCell state (e.g. whether PSCell being on dormancy BWP) to MN to indicate that a SCG failure occurs in SN and PSCell is being on dormancy BWP.

Step 3: MN forwards the received information about SCG failure and PSCell state to the SN.

Step 4: SN may optimize the configuration for dormancy BWP based on the received information about SCG failure and PSCell state.

III. Example Techniques for Mobility Enhancement Related Reporting

Currently, Dual Active Protocol Stack (DAPS) is introduced for mobility enhancement. When DAPS is applied for handover, DAPS packet data convergence protocol (PDCP) is configured in handover target to reduce handover delay, but will cost more resource in the handover target. Sometimes, UE may reach the maximum number of aggregated carriers according to its capability more easier due to applying DAPS PDCP. Also, Conditional PSCell Addition/Change (CPAC) is introduced to increase the reliability of PSCell Addition/Change. Also, Conditional Handover (CHO) is introduced to increase the reliability of handover (HO). Also, successful handover report may be introduced to report the situation that the signal is bad although HO is successful.

In the example techniques described in Section III, a PDCP type (e.g. DAPS PDCP, normal PDCP) and/or an indication whether maximum number of aggregated carriers being reached are introduced and reported to base station to enable recognition of a situation when mobility failure occurs. Mobility failure can include, for example, a handover failure or a PSCell change failure. Also, CPAC failure information (e.g. Is Conditional PSCell Change triggered by MN or SN) is introduced to increase the reliability of CPAC (e.g. Disable SN triggered Conditional PSCell Change according to the statistic failure number of SN triggered Conditional PSCell Change). Also, CHO failure information (e.g. CHO failure cause) is introduced to increase the reliability of CHO. Also, successful handover related information is introduced to enhance the successful handover report for network optimization (e.g. for HO and/or RACH). The example techniques for mobility enhancement related reporting are further described in Example Embodiments III.1 to III.4 below.

Example Embodiment III.1

Figure 7:
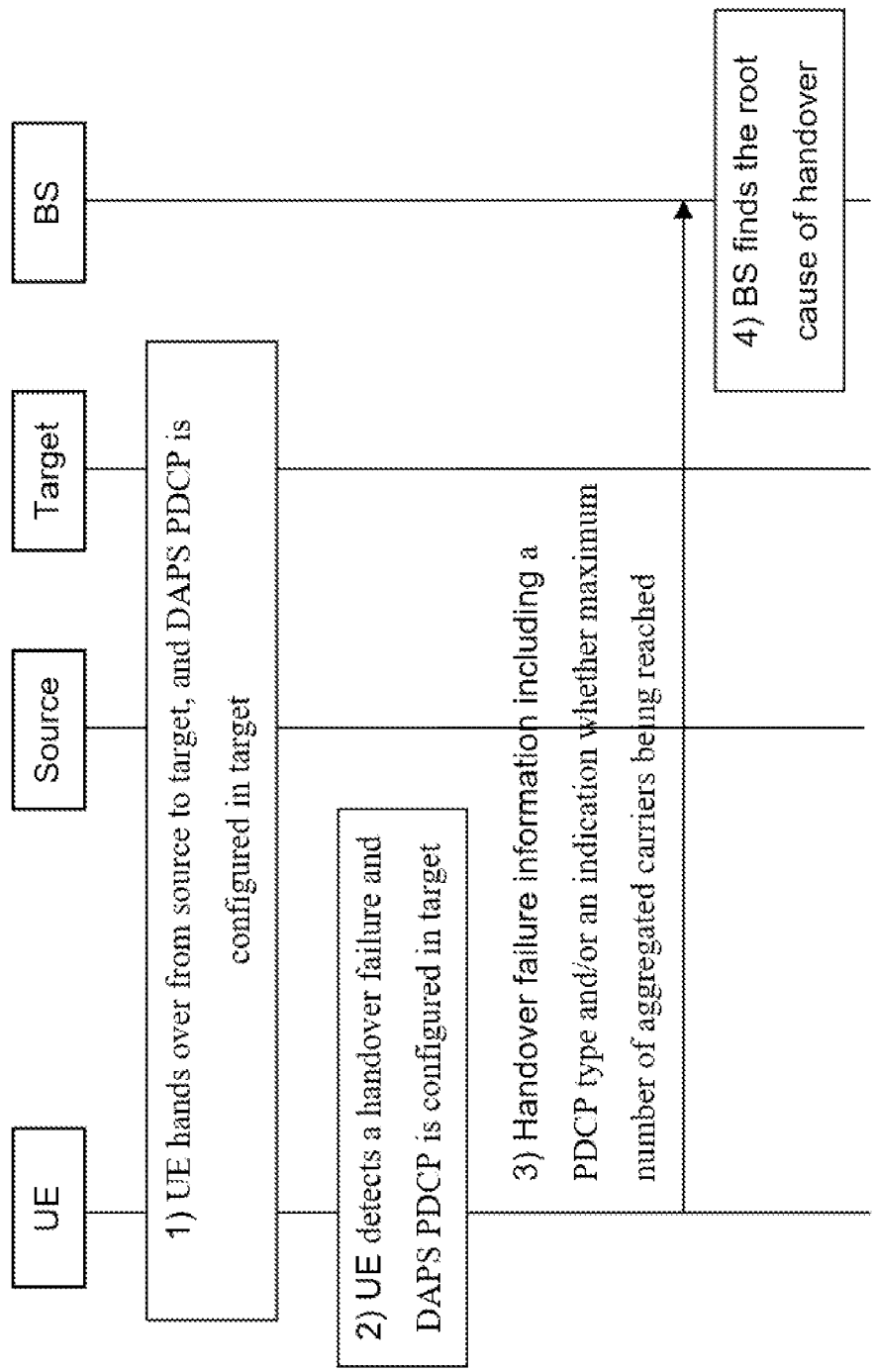
FIG. 7 illustrates an example signaling procedure for data collection for handover failure and being configured with Dual Active Protocol Stack (DAPS) Packet Data Convergence Protocol (PDCP).

FIG. 7 illustrates an example signaling procedure for data collection for handover failure and being configured with DAPS PDCP corresponding to this example embodiment.

Step 1: UE hands over from source (e.g., a first base station) to target (e.g., a second base station), and DAPS PDCP is configured in target.

Step 2: UE detects a handover failure and DAPS PDCP is configured in target.

Step 3: UE reports handover failure information including a PDCP type (e.g. DAPS PDCP) and/or an indication whether maximum number of aggregated carriers being reached to BS (BS here may be the source, the target or the others). The received handover failure information may be forwarded to the source or the target.

Step 4: BS (BS here may be the source, the target or the others) finds the root cause of handover failure based on the received handover failure information.

Example Embodiment III.2

Figure 8:
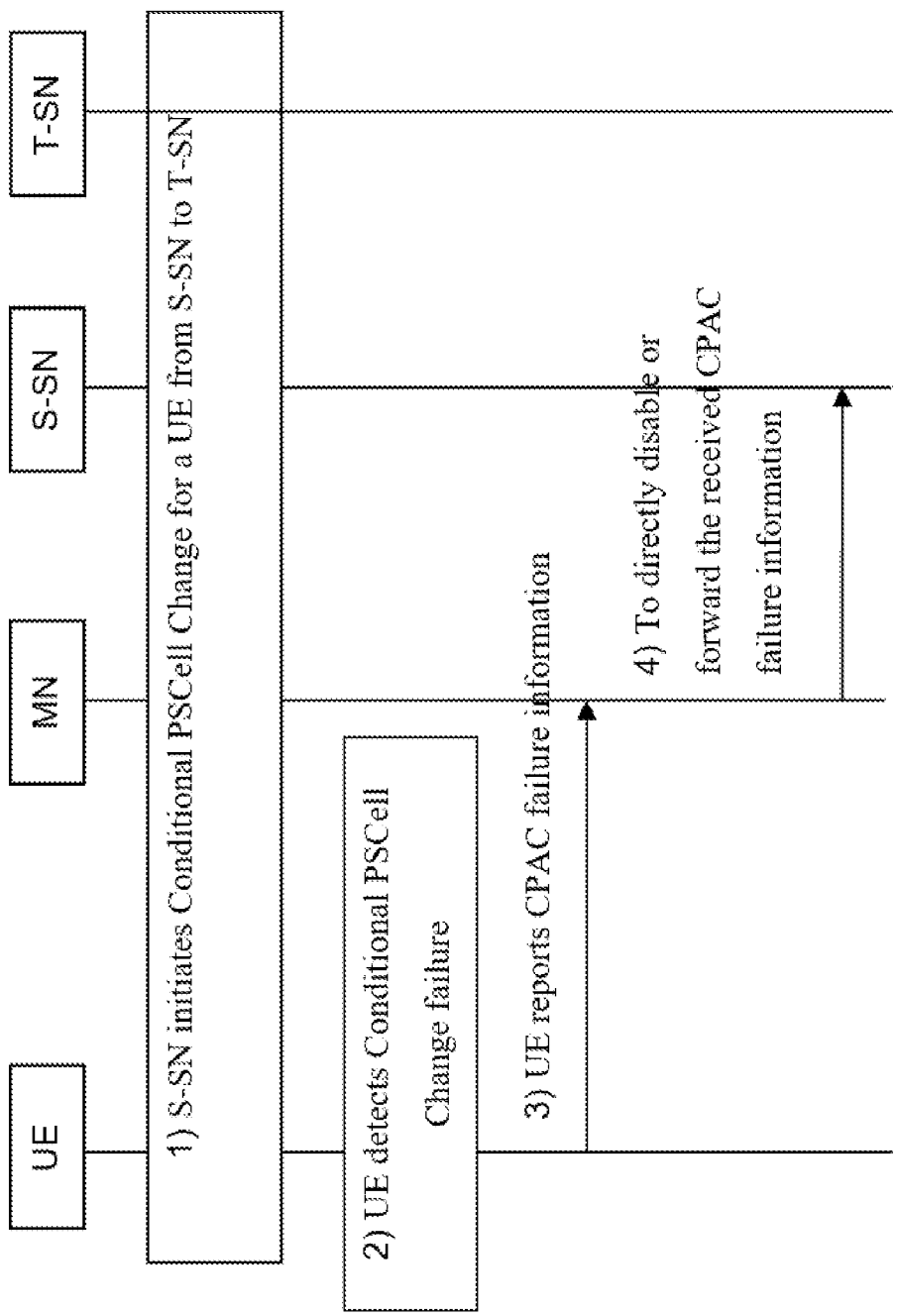
FIG. 8 illustrates an example signaling procedure for data collection for Conditional PSCell Addition/Change (CPAC) failure.

FIG. 8 illustrates an example signaling procedure for data collection for CPAC failure corresponding to this example embodiment.

Step 1: S-SN initiates Conditional PSCell Change for a UE from S-SN to T-SN.

Step 2: UE detects Conditional PSCell Change failure, saves related failure information e.g. S-SN ID, T-SN ID, trigger node (MN or SN).

Step 3: UE reports CPAC failure information e.g. S-SN ID, T-SN ID, trigger node (MN or SN) to MN.

Step 4: MN may sends a message to S-SN to directly disable SN triggered Conditional PSCell Change according to the statistic result of SN triggered Conditional PSCell Change failure received from UE. Or MN sends a message to S-SN to forward the received CPAC failure information to S-SN, lets the S-SN to disable SN triggered Conditional PSCell Change by its own decision.

Example Embodiment III.3

Figure 9:
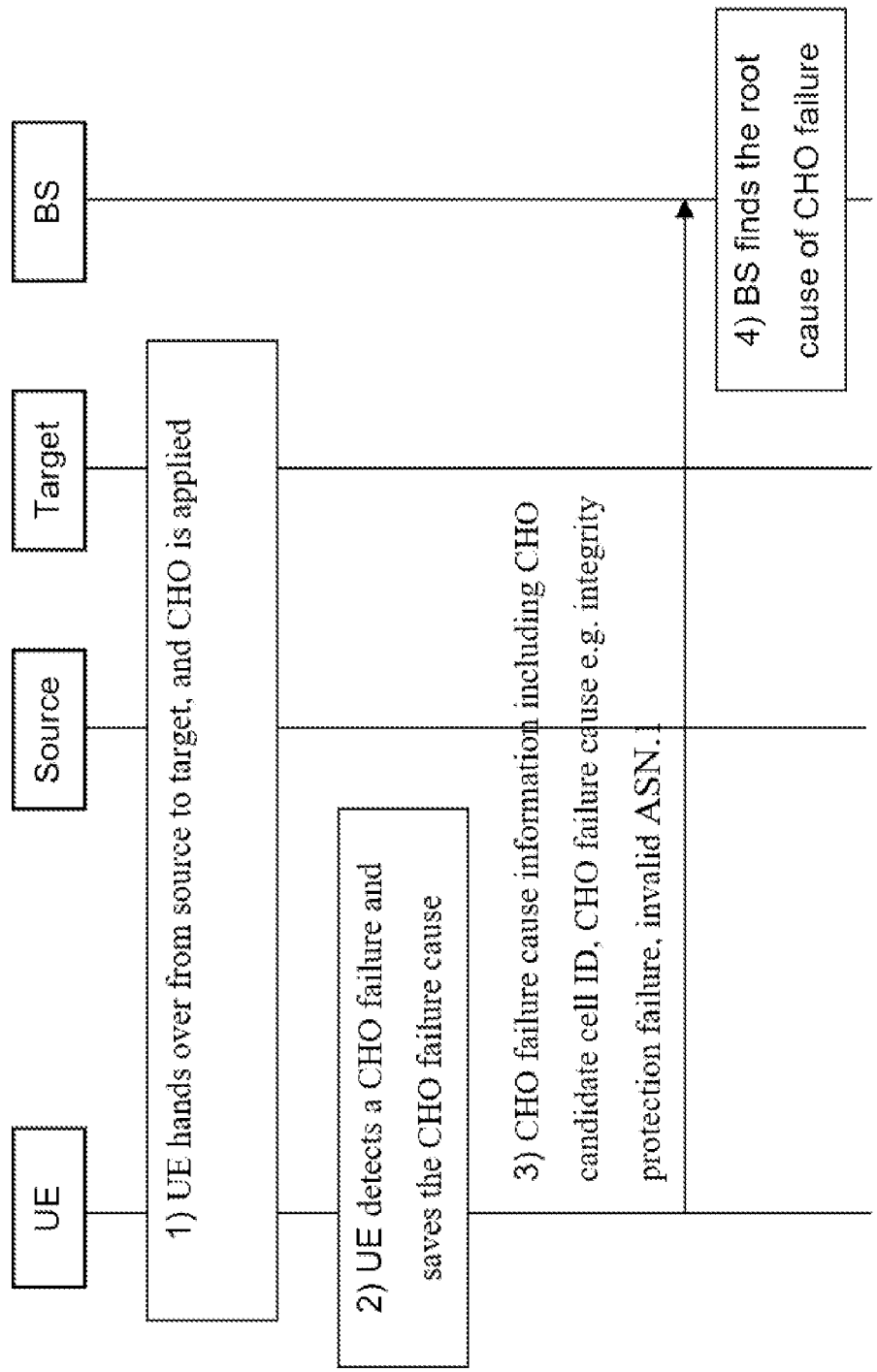
FIG. 9 illustrates an example signaling procedure for data collection for Conditional Handover (CHO) failure.

FIG. 9 illustrates an example signaling procedure for data collection for CHO failure corresponding to this example embodiment.

Step 1: UE hands over from source to target, and CHO is applied.

Step 2: UE detects a CHO failure, and saves the CHO failure cause information e.g. integrity protection failure, invalid ASN.1 occurred when decoding a container included in a CHO command related to one or more CHO candidate cell(s).

Step 3: UE reports CHO failure cause information including CHO candidate cell ID, CHO failure cause e.g. integrity protection failure, invalid ASN.1 to BS (BS here may be the source, the target or the others). The received CHO failure cause information may be forwarded to the source or the target.

Step 4: BS (BS here may be the source, the target or the others) finds the root cause of CHO failure based on the received CHO failure cause information.

Example Embodiment III.4

Figure 10:
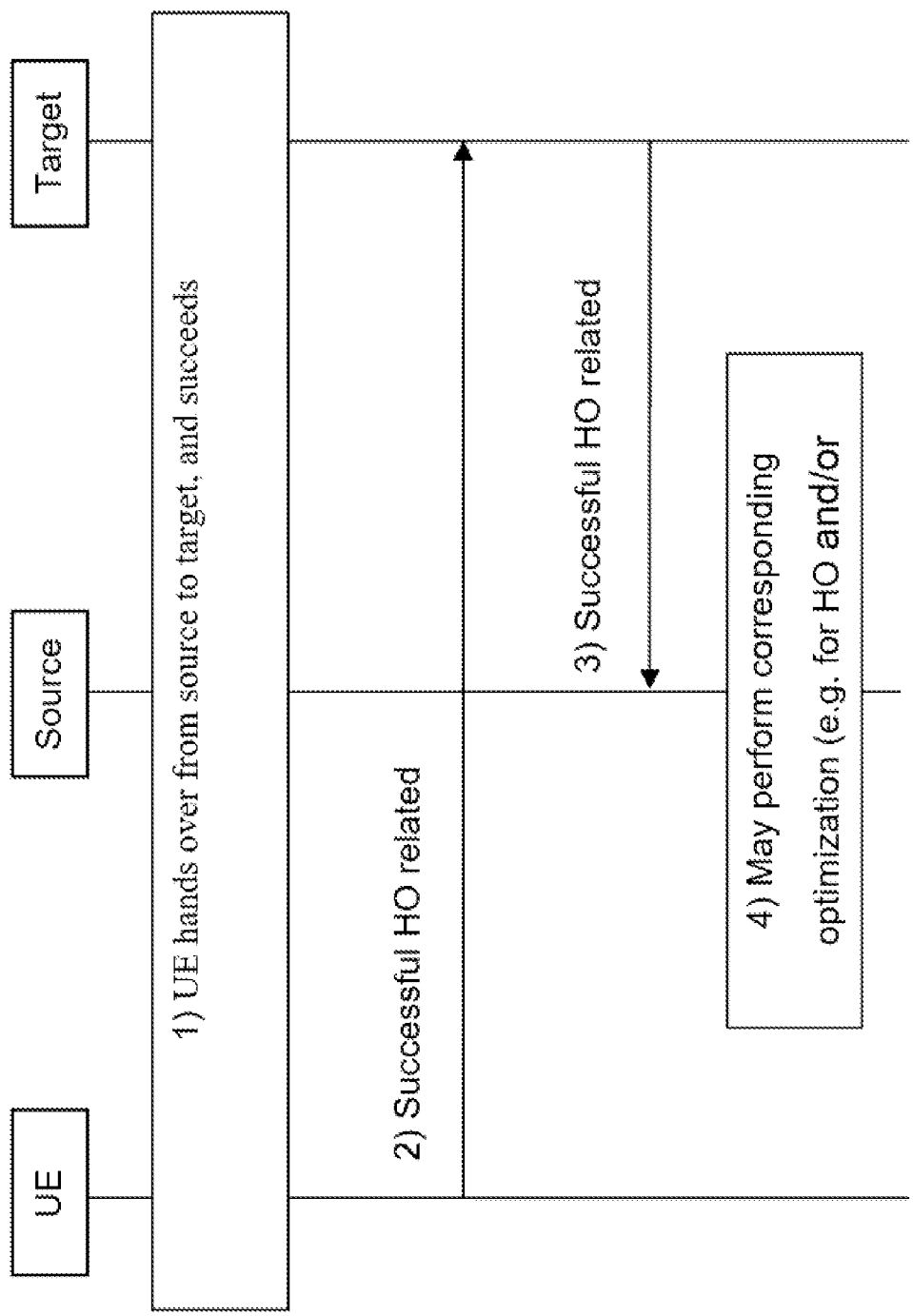
FIG. 10 illustrates an example signaling procedure for data collection for a successful handover.

FIG. 10 illustrates an example signaling procedure for data collection for a successful handover corresponding to this example embodiment.

Step 1: UE hands over from source to target, and succeeds.

Step 2: UE reports successful HO related information including HO type (e.g. CHO, DAPS, normal HO) and/or 2-step RACH related information to the target. The 2-step RACH related information includes at least one of: number of fallback between 2-step RACH and 4-step RACH per RACH procedure, number of fallback between 2-step RACH and 4-step RACH per beam, indicator to indicate fallback between 2-step RACH and 4-step RACH per RACH procedure (which is set to true if 2-Step RACH at least fallback to 4-step RACH once during a RACH procedure), indicator to indicate fallback between 2-step RACH and 4-step RACH per beam (which is set to true if 2-step RACH at least fallback to 4-step RACH once related to a beam during a RACH procedure), number of PUSCH transmission occasion (PO) selected per beam, PO index selected per beam (listed in chronological order of attempts), indicator to indicate whether the maximum transmission power is used for transmission of PUSCH payload of 2-step RACH per RACH procedure, indicator to indicate whether the maximum transmission power is used for transmission of PUSCH payload of 2-step RACH per PO, indicator to indicate whether the maximum transmission power is used for transmission of PUSCH payload of 2-step RACH per beam (if the maximum transmission power is used for transmission of PUSCH payload of 2-step RACH at least on one PO mapped to a beam, then the maximum transmission power is used for this beam), maximum power level used for transmission of PUSCH payload of 2-step RACH per RACH procedure, maximum power level used for transmission of PUSCH payload of 2-step RACH per PO, maximum power level used for transmission of PUSCH payload of 2-step RACH per beam (in case multiple PO is mapped to one beam, it may be a list of maximum power level on each PO, or the maximum power level among all PO), number of power ramping on each PO for transmission of PUSCH payload of 2-step RACH, number of power ramping on each beam, maximum preamble transmission power on each beam, number of fallback between 2-step CFRA to 2-step CBRA per RACH procedure, number of fallback between 2-step CFRA to 2-step CBRA per beam, number of preambles sent on each beam and the beam indices, indexes of tried beams and number of preambles sent on each tried beam listed in chronological order of attempts, contention detected indication per beam (where the contention detected indication is set as true if at least one failed contention resolution is detected on this beam), backoff related information (e.g. number of backoff with value larger than 0 used during RACH attempt utilizing RACH resource configured for 2-step RACH, or list of backoff value used during RACH attempt utilizing RACH resource configured for 2-step RACH, or maximum backoff value used during RACH attempt utilizing RACH resource configured for 2-step RACH), number of preambles sent in each preamble group per RACH procedure, number of preambles sent in each preamble group per beam, indication to indicate which group of preamble is selected per RACH procedure (such group A, group B, or both), indication to indicate which group of preamble is selected per beam (such group A, group B, or both), indication to indicate which type of beam is selected per RACH procedure (such as SSB, CSI-RS, or both), list of beam type selected in chronological order per RACH procedure.

Step 3: Target forwards the successful handover related information to the source.

Step 4: Source may perform corresponding optimization (e.g. for HO and/or RACH) according to the successful handover related information.

IV. Example Techniques for UE Assistant Information Related Reporting

Currently, UE assistant information is introduced, however, network doesn't know the situation about usage of UE assistant information in RAN node.

In the example techniques described in Section IV, information related to Usage of UE assistant information is introduced to enable network to estimate the situation about usage of UE assistant information in RAN node. An example technique for UE assistant information related reporting is further described in Example Embodiment IV.1 below.

Example Embodiment IV.1

Figure 11:
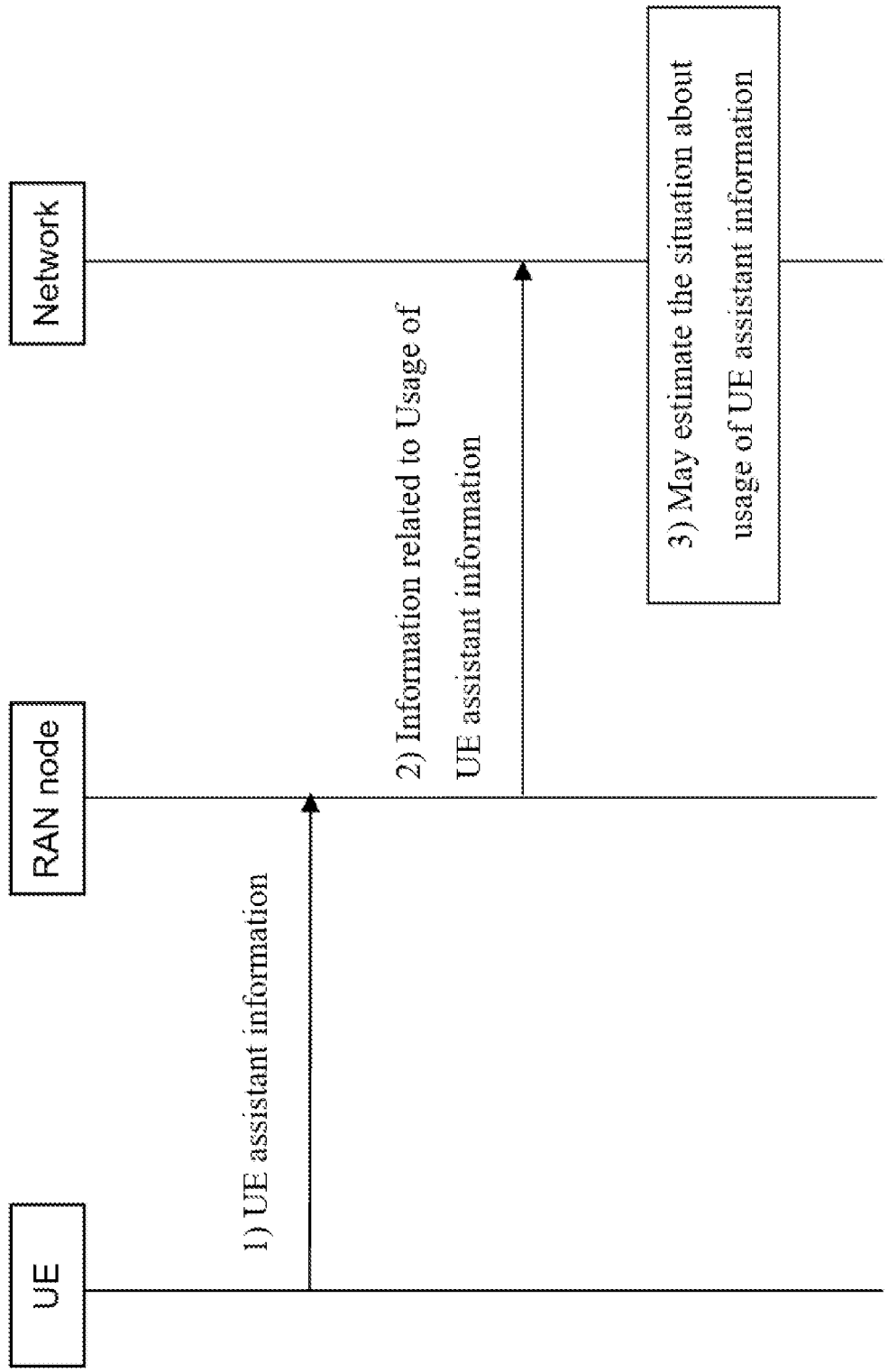
FIG. 11 illustrates an example signaling procedure for data collection for usage of User Equipment (UE) assistant information.

FIG. 11 illustrates an example signaling procedure for data collection for usage of UE assistant information corresponding to this example embodiment.

Step 1: RAN node (e.g. BS) receives UE assistant information from one or more UE(s). The UE assistant information may include one or more parameters (e.g., signal strength, delay, etc.,) and one or more values corresponding to the one or more parameters. The UE may measure the value(s) for the parameter(s), for example, during early measurement as described in this patent document.

Step 2: RAN node sends information related to Usage of UE assistant information to network (e.g. core network (CN), trace collection entity (TCE), operation administration and maintenance (OAM)). The RAN node can send usage related information which indicates whether the RAN node received and/or used from the UE assistant information to adjust performance of the RAN node. The usage related information can also include metrics related to the UE assistant information. The information related to Usage of UE assistant information includes at least one of: (1) indication whether RAN node has received UE assistant information, (2) indication whether RAN node has used UE assistant information, (3) result of RAN node using UE assistant information (e.g. happy or not), (4) number of records of UE assistant information RAN node has received, (5) number of records of UE assistant information RAN node has used, (6) list of types of UE assistant information RAN node has received, (7) list of types of UE assistant information RAN node has used, (8) number of records of UE assistant information RAN node has received per each type, (9) number of records of UE assistant information RAN node has used per each type, (10) result of RAN node using UE assistant information (e.g. happy or not) per type, (11) number of UE(s) RAN node has received UE assistant information from, (12) number of UE(s) RAN node has used UE assistant information received from, (13) number of UE(s) RAN node has received UE assistant information from per each type, or (14) number of UE(s) RAN node has used UE assistant information received from per each type.

Step 3: Network may estimate the situation about usage of UE assistant information in RAN node.

V. Example Techniques for Quality of Service (QoS) or Quality of Experience (QoE) Enhancement Currently, XR (e.g. AR, VR) are introduced, some XR relative QoS flow may change its QoS requirement (e.g. burst throughput, delay, reliability) greatly over time.

In the example techniques described in Section V, some enhancement is introduced in RAN node and/or UE to increase the QoS/QoE especially for XR service. An example technique for QoS/QoE enhancement is further described in Example Embodiment V.1 below.

Example Embodiment V.1

Figure 12:
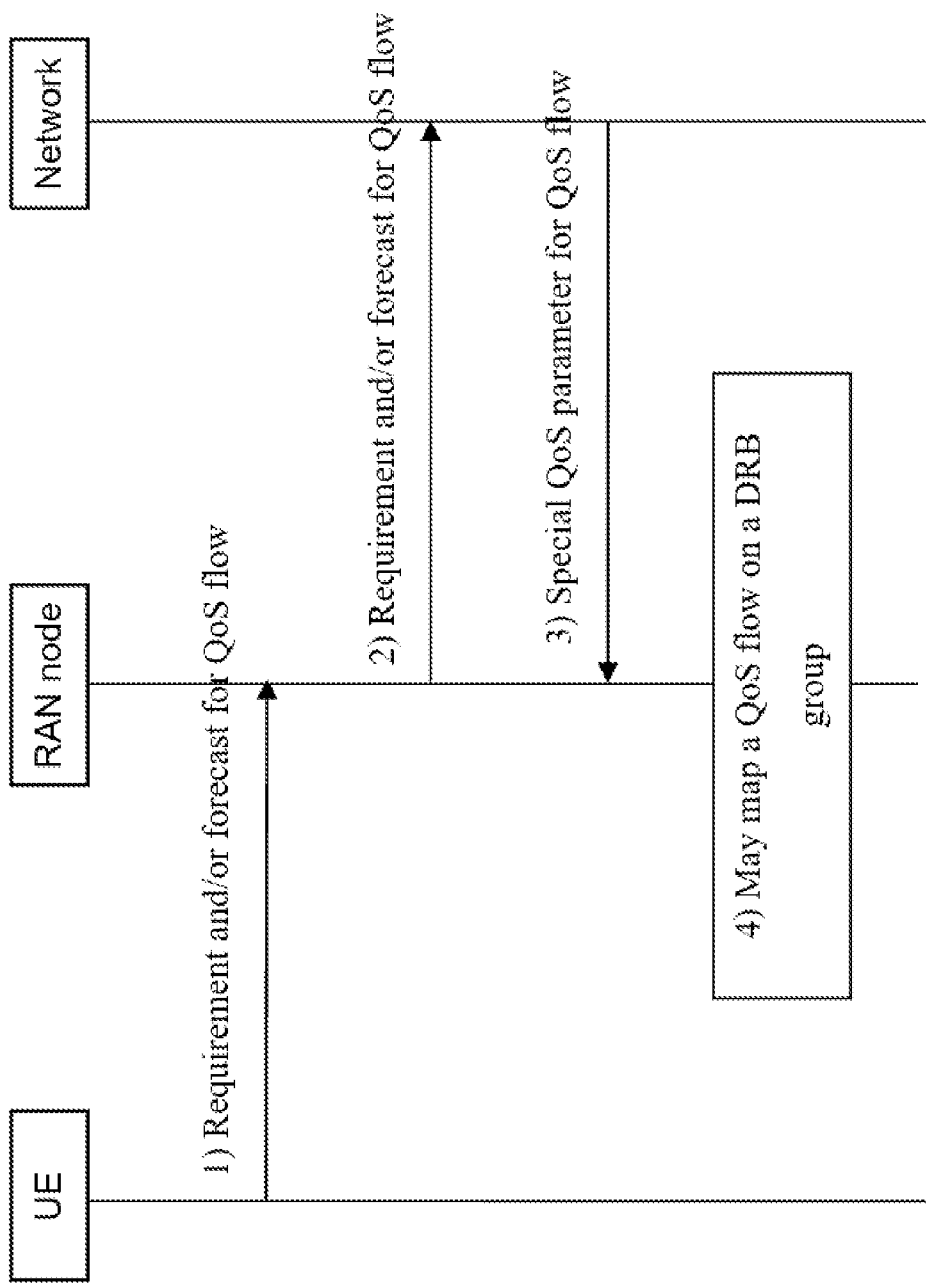
FIG. 12 illustrates an example signaling procedure for Quality of Service (QoS) or Quality of Experience (QoE) enhancement

FIG. 12 illustrates an example signaling procedure for QoS/QoE enhancement corresponding to this example embodiment.

Step 1: UE sends requirement and/or forecast for QoS flow to RAN node (e.g. BS).

Step 2: RAN node forwards the requirement and/or forecast for QoS flow to network (e.g. CN, Application Server).

Step 3: Network may send special QoS parameter for QoS flow to RAN node, including e.g. indicator to indicate a QoS flow its QoS requirement is changed greatly over time, list of QoS parameter mostly to be used by a QoS flow. QoS parameter can include for example, maximum delay or latency values.

Step 4: RAN node may map a QoS flow on a data radio bearer (DRB) group (e.g., list of one or more DRB), according to e.g. the received list of QoS parameter mostly to be used by the QoS flow. For example, the RAN node can map the QoS flow to a first DRB from the DRB group and can then quickly switch mapping to a second different DRB from the DRB group if needed (e.g., the RAN node determines that measured performance of the first DRB is less than a value indicated by the QoS parameter).

Figure 13A:
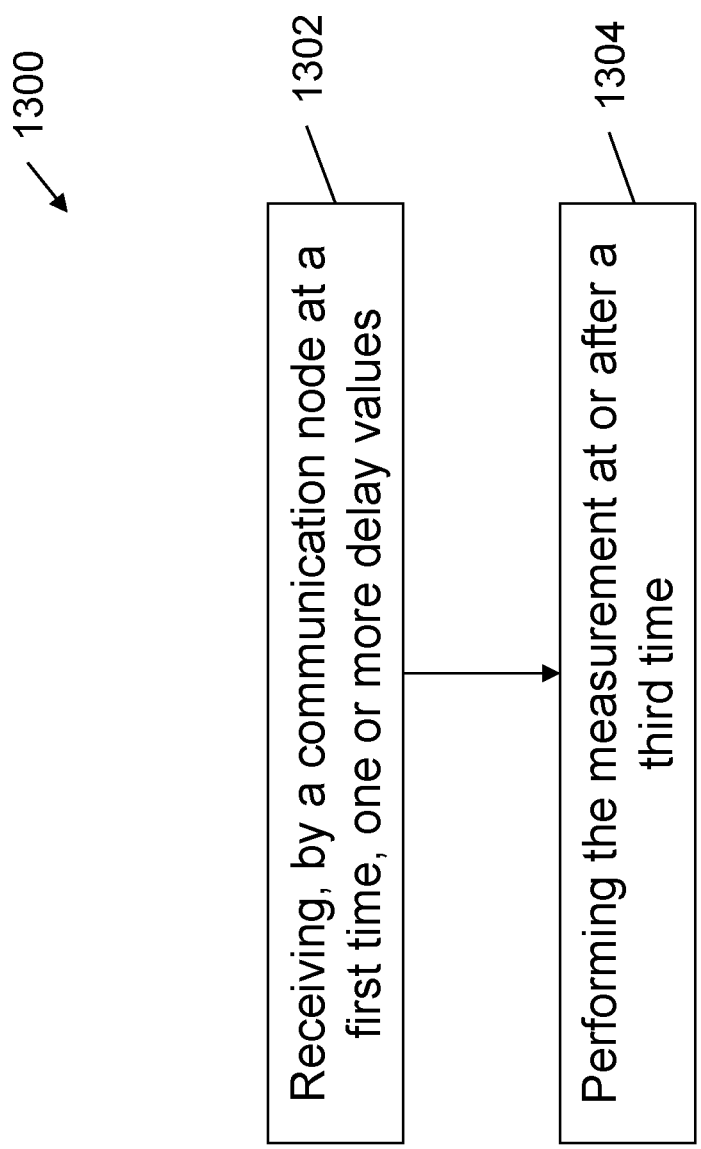
FIG. 13A shows an exemplary flowchart for performing a measurement based on a received delay time.

FIG. 13A shows an exemplary flowchart 1300 for performing a measurement based on a received delay time. At operation 1302, the communication node receives, at a first time, one or more delay values, where each delay value is indicative of amount of time by which a measurement is to be delayed. At operation 1304, the communication node performs the measurement at or after a third time, where the third time is based on a delay value from the one or more delay values and a second time when the communication node enters an idle state or an inactive state, where the first time precedes the second time in time, and where the second time precedes the third time in time. For example, the communication node determines the third time by adding a delay time indicated by the delay value to the second time when the communication node enters the idle state or the inactive state.

In some embodiments of method 1300, the one or more delay values includes a first delay value associated with the idle state and a second delay value associated with the inactive state. In some embodiments of method 1300, the one or more delay values includes a first delay value based on an amount of time the communication node spends in the idle state or in an connected state, and the one or more delay values includes a second delay value based on a second amount of time the communication node spends in the inactive state or in the connected state. In some embodiments, the method 1300 further comprises transmitting, to a network node, the delay value and/or a second time value indicative of a second amount of time within which the measurement is to be performed, where the delay value or the second time value is transmitted after the communication node enters a connected state or an active state, and where the delay value and/or the second time value are sent in response to a result of the measurement being invalid.

FIG. 13B shows an exemplary flowchart 1310 for transmitting a report in response to an occurrence of a SCG failure. At operation 1312, the communication node transmits a report to a network node in response to an occurrence of a failure of a secondary cell group (SCG), where the report includes an indication of the failure of the SCG and a state of the primary SCG cell (PSCell) when the failure occurred. The communication node can determine the occurrence of a failure of the SCG and trigger the generation and transmission of the report. In some embodiments of method 1310, the state of the PSCell indicates whether the PSCell is operating on a dormant bandwidth part (BWP). In some embodiments of method 1310, the network node includes a master node (MN).

Figure 13C:
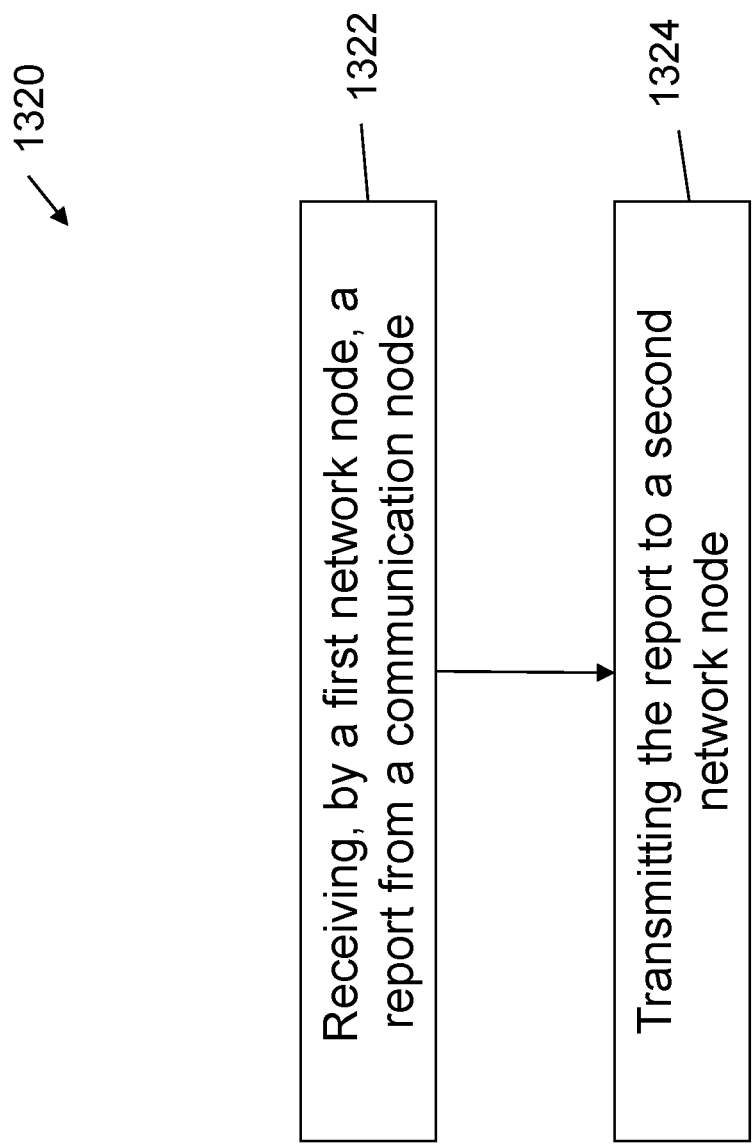
FIG. 13C shows an exemplary flowchart for processing a report in response to an occurrence of a SCG failure.

FIG. 13C shows an exemplary flowchart 1320 for processing a report in response to an occurrence of a SCG failure. At operation 1322, a first network node receives a report from a communication node, where the report is received in response to an occurrence of a failure of a secondary cell group (SCG), and where the report includes an indication of the failure of the SCG and a state of the primary SCG cell (PSCell) when the failure occurred. At operation 1324, the first network node transmits the report to a second network node. In some embodiments of method 1320, the state of the PSCell indicates whether the PSCell is operating on a dormant bandwidth part (BWP). In some embodiments of method 1320, the first network node includes a master node (MN), and where the second network node includes a secondary node (SN).

Figure 13D:
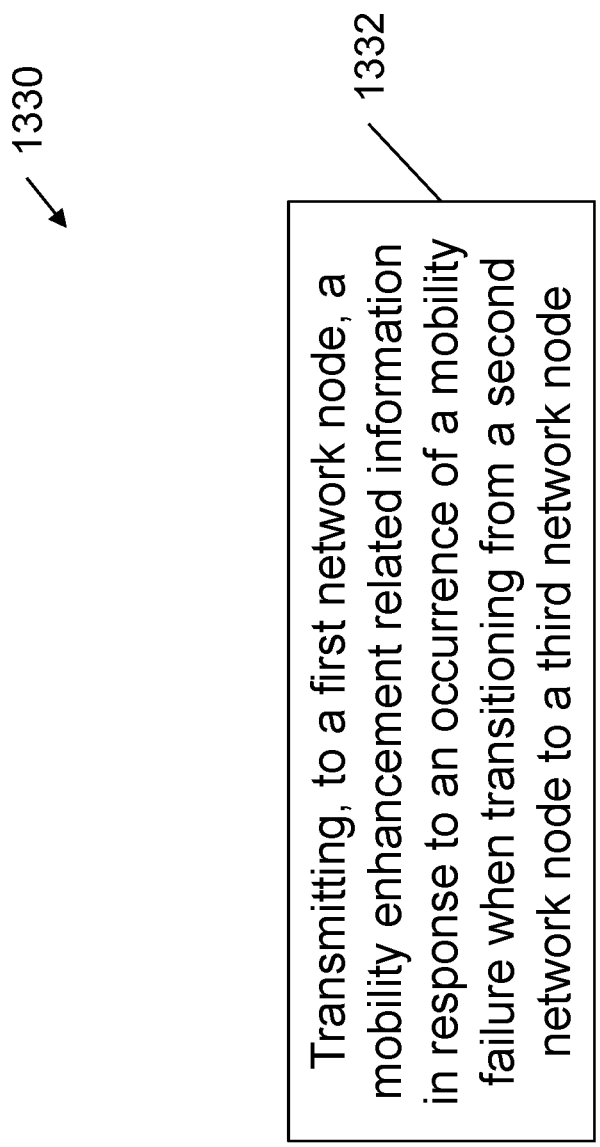
FIG. 13D shows an exemplary flowchart for transmitting a mobility enhancement related information in response to an occurrence of a handover failure.

FIG. 13D shows an exemplary flowchart 1330 for transmitting a mobility enhancement related information in response to an occurrence of a handover failure. At operation 1332, a communication node transmits to a first network node a mobility enhancement related information in response to an occurrence of a mobility failure when transitioning from a second network node to a third network node, where the mobility enhancement related information includes: a Dual Active Protocol Stack (DAPS) related information, a Conditional Primary secondary cell group cell Addition or Change (CPAC) failure information, a Conditional Handover (CHO) failure cause information, and/or a successful handover related information.

In some embodiments of method 1330, the DAPS related information includes a Packet Data Convergence Protocol (PDCP) type and/or an indication whether a maximum number of aggregated carriers are reached. In some embodiments of method 1330, the CHO failure cause information includes an integrity protection failure or an invalid abstract syntax notation (ASN.1). In some embodiments of method 1330, the successful handover related information includes a handover type and/or a two-step Random Access Channel (RACH) related information. In some embodiments of method 1330, the CPAC failure indication indicates whether a conditional Primary Secondary cell group Cell (PSCell) change is triggered by a master node or a secondary node.

Figure 13E:
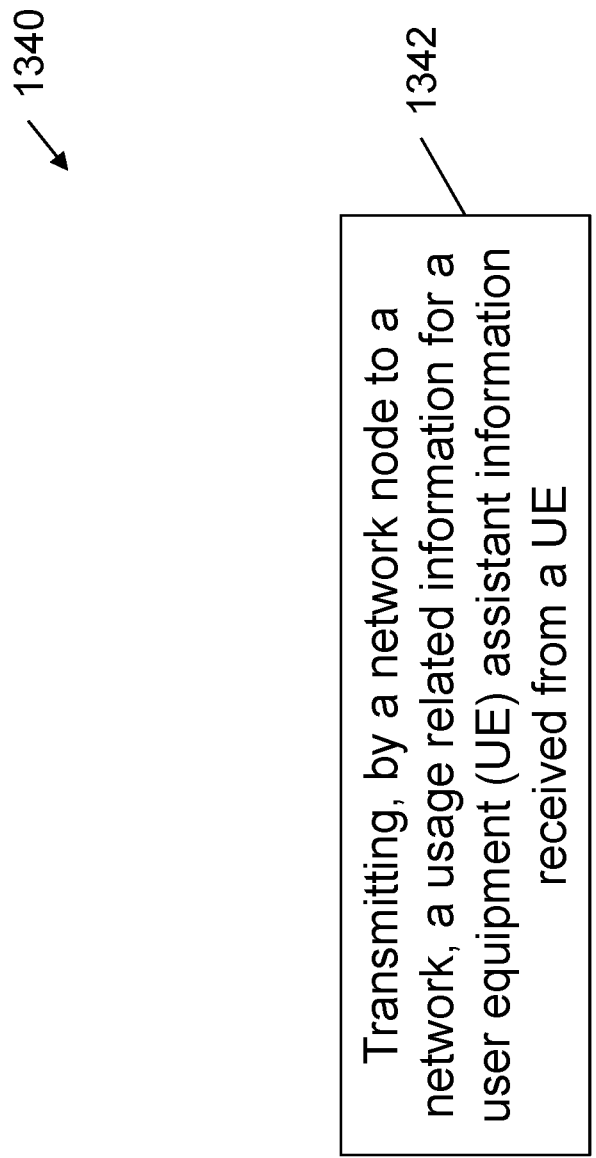
FIG. 13E shows an exemplary flowchart for transmitting a usage related information for a user equipment (UE) assistant information.

FIG. 13E shows an exemplary flowchart 1340 for transmitting a usage related information for a user equipment (UE) assistant information. At operation 1342, a network node transmits, to a network, a usage related information for a user equipment (UE) assistant information received from a UE, where the usage related information indicates whether the network node received or used the UE assistant information and/or metrics associated with the UE assistant information, where the UE assistant information includes one or more parameters and one or more corresponding values for each parameter collected by the UE for network performance enhancement, and where the usage related information includes: an indication whether the network node received the UE assistant information, an indication whether the network node used the UE assistant information, a result of the network node using the UE assistant information, a number of records of the UE assistant information that the network node has received, a number of records of the UE assistant information that the network node has used, a list of types of the UE assistant information that the network node has received, a list of types of the UE assistant information that the network node has used, a number of records of the UE assistant information that the network node has received per each type of the UE assistant information, a number of records of the UE assistant information that the network node has used per each type of the UE assistant information, a result of the network node using UE assistant information per type of the UE assistant information, a number of user equipment from which the network node has received the UE assistant information, a number of user equipment from which the network node has received and used the UE assistant information, a number of user equipment from which the network node has received the UE assistant information per each type of the UE assistant information, or a number of user equipment from which the network node has received and used the UE assistant information per each type of the UE assistant information. In some embodiments of method 1340, the network includes a core network, a Trace Collection Entity (TCE), or an Operation Administration and Maintenance (OAM).

Figure 13F:
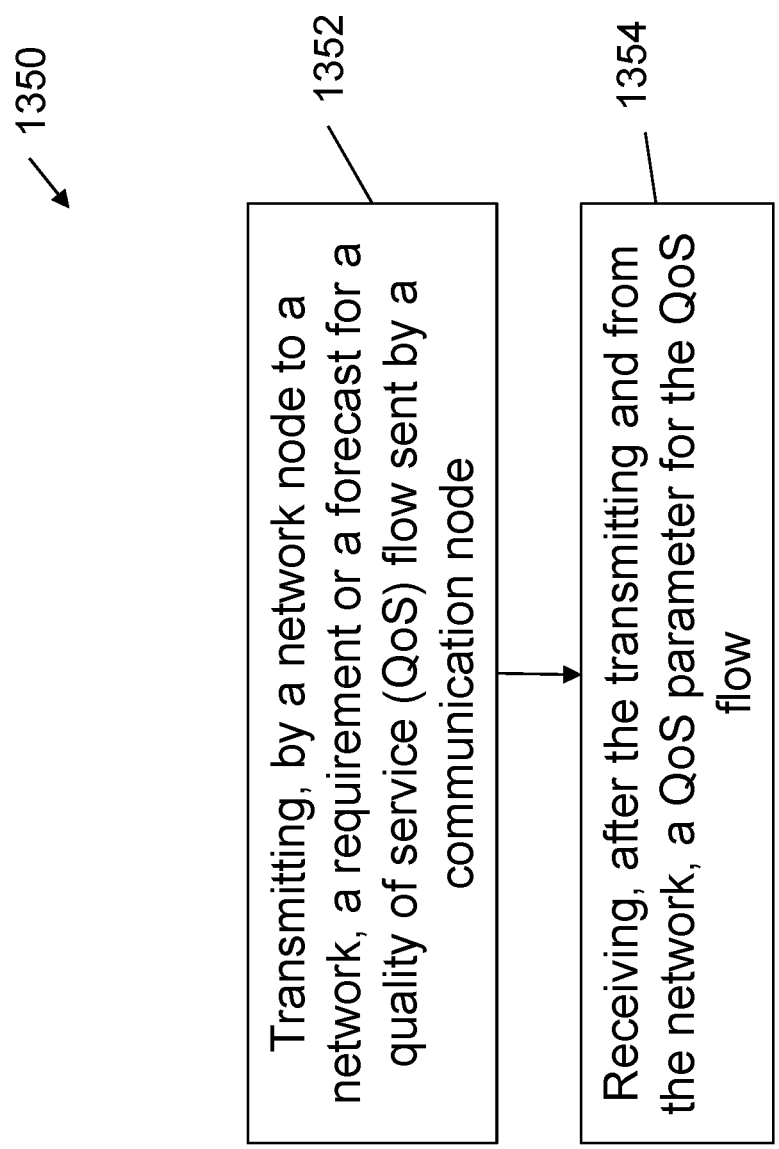
FIG. 13F shows an exemplary flowchart for receiving a special QoS parameter.

FIG. 13F shows an exemplary flowchart 1350 for receiving a special QoS parameter. At operation 1352, a network node transmits, to a network, a requirement or a forecast for a quality of service (QoS) flow sent by a communication node. At operation 1354, the network node receives, after the transmitting and from the network, a QoS parameter for the QoS flow, where the QoS parameter includes: an indicator that a QoS requirement of the QoS flow has changed over time, or a list of one or more QoS parameters to be used by the communication node for the Qos flow.

In some embodiments of method 1350, the method further comprises mapping the QoS flow to a list of one or more data radio bearers (DRBs) based on the QoS parameter. In some embodiments of method 1350, the network node switches the mapping of the QoS flow from a first DRB from the list of one or more DRBs to a second DRB from the list of one or more DRBs. In some embodiments of method 1350, the network includes a core network or an application server.

Figure 13G:
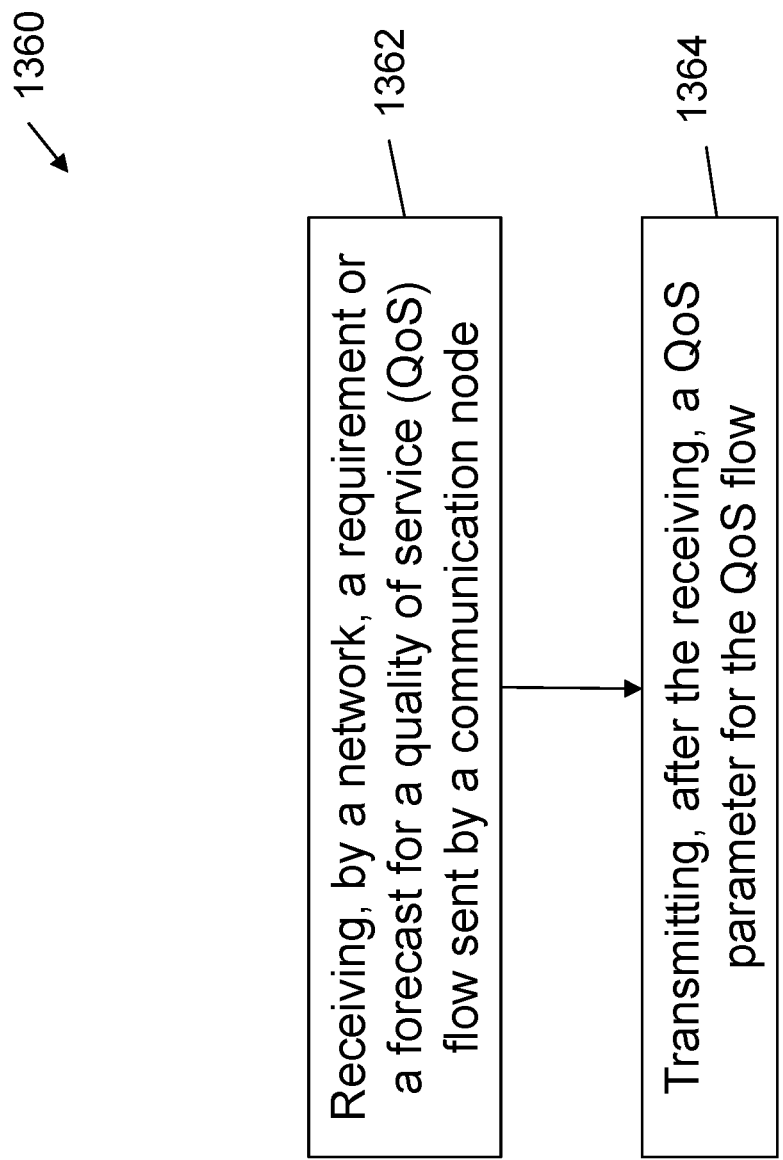
FIG. 13G shows an exemplary flowchart for transmitting a special QoS parameter.

FIG. 13G shows an exemplary flowchart 1360 for transmitting a special QoS parameter. At operation 1362, a network receives a requirement or a forecast for a quality of service (QoS) flow sent by a communication node. At operation 1364, the network transmits, after the receiving, a QoS parameter for the QoS flow, where the QoS parameter includes: an indicator that a QoS requirement of the QoS flow has changed over time, or a list of one or more QoS parameters to be used by the communication node for the Qos flow. In some embodiments of method 1360, the network receives the requirement or the forecast for the QoS flow directly from the communication or from a network node. In some embodiments of method 1360, the network includes a core network or an application server.

Figure 14:
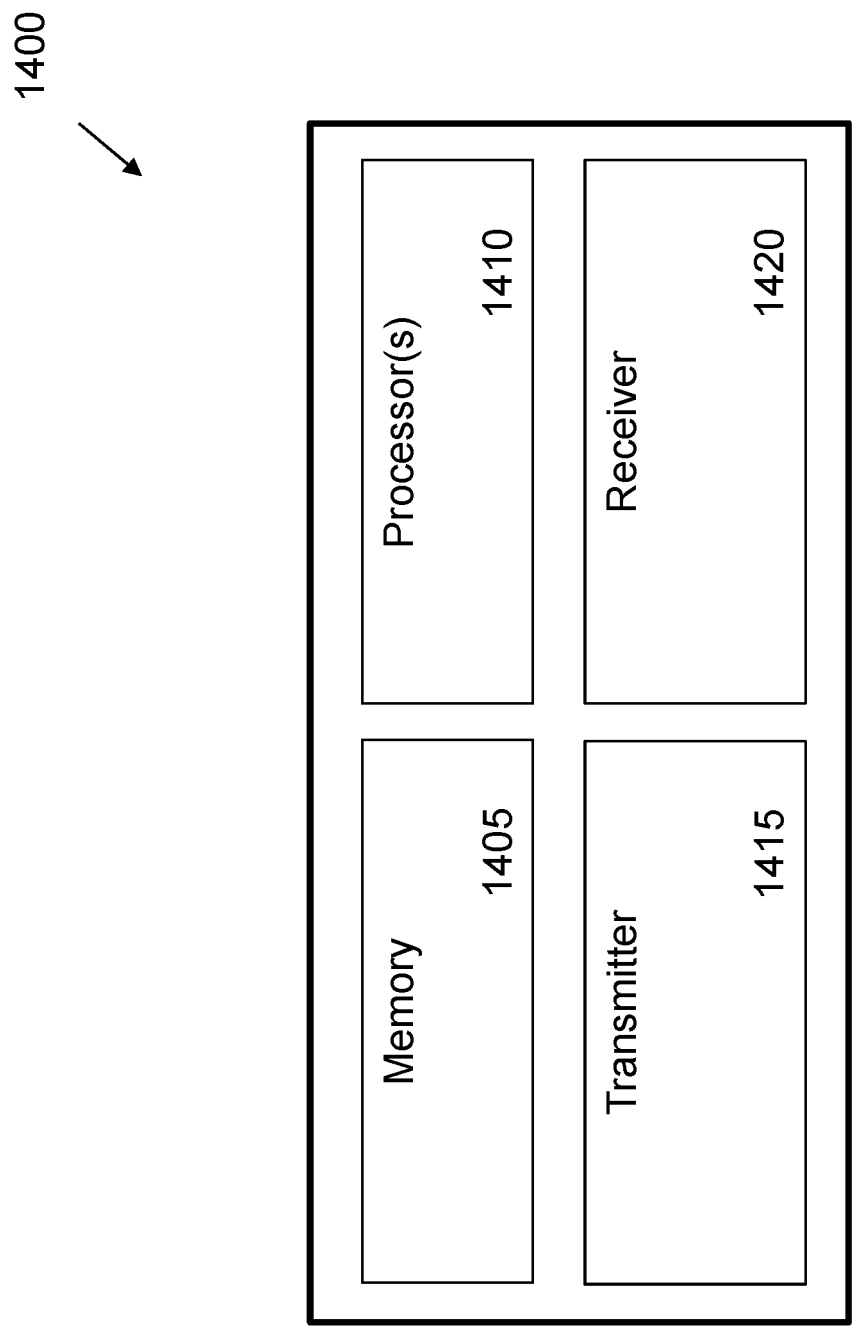
FIG. 14 shows an exemplary block diagram of a hardware platform that may be a part of a network node or a communication node or a network.

FIG. 14 shows an exemplary block diagram of a hardware platform 1400 that may be a part of a network node (e.g., RAN node or base station) or a communication node (e.g., UE) or a network (e.g., core network, TCE, OAM or application server). The hardware platform 1400 includes at least one processor 1410 and a memory 1405 having instructions stored thereupon. The instructions upon execution by the processor 1410 configure the hardware platform 1400 to perform the operations described in FIGS. 4 to 13G and in the various embodiments described in this patent document. The transmitter 1415 transmits or sends information or data to another node. For example, a network node transmitter can send a message comprising a delay time to a user equipment. The receiver 1420 receives information or data transmitted or sent by another node. For example, a user equipment can receive a message comprising a delay time from a network node.

The following section describes example methods for data collection and/or performance enhancement for wireless network.

In a first example embodiment, a UE receives a delay time, if received, UE starts performing early measurement after a time according to the delay time. Thus, for example, UE does not start performing early measurement immediately when entering into RRC_IDLE or RRC_INACTIVE state. In some implementations of the first example embodiment, the delay time can be configured with different value for UE in RRC_IDLE or RRC_INACTIVE state, or even with different value for each UE in RRC_IDLE or RRC_INACTIVE state according to UE behaviour (e.g. time duration with high probability staying in RRC_IDLE or RRC_INACTIVE state for that UE). In some implementations of the first example embodiment, UE records the value of the delay time and/or the value of the timer T331 and reports to base station, when UE enters into RRC_CONNECTED state and considers the early measurement result is invalid.

In a second example embodiment, a UE reports a PSCell state (e.g. whether PSCell being on dormancy BWP) to RAN node (e.g. included in SCG failure information message reported to MN) when SCG failure is occurred.

In a third example embodiment, a UE reports Mobility enhancement related information to RAN node (e.g. BS), including at least one of: DAPS related information, CPAC failure information (e.g. Is Conditional PSCell Change triggered by MN or SN), CHO failure cause information, or successful handover related information.

In some implementations of the third example embodiment, the DAPS related information may include a PDCP type (e.g. DAPS PDCP, normal PDCP) and/or an indication whether maximum number of aggregated carriers being reached; the CHO failure cause information may include integrity protection failure or invalid ASN.1; or the successful handover related information may include HO type (e.g. CHO, DAPS HO, normal HO) and/or 2-step RACH related information.

In a fourth example embodiment, a RAN node (e.g. BS) sends information related to Usage of UE assistant information to network (e.g. CN, TCE, OAM). In some implementations of the fourth example embodiment, the information related to Usage of UE assistant information includes at least one of: indication whether RAN node has received UE assistant information, indication whether RAN node has used UE assistant information, result of RAN node using UE assistant information (e.g. happy or not), number of records of UE assistant information RAN node has received, number of records of UE assistant information RAN node has used, list of types of UE assistant information RAN node has received, list of types of UE assistant information RAN node has used, number of records of UE assistant information RAN node has received per each type, number of records of UE assistant information RAN node has used per each type, result of RAN node using UE assistant information (e.g. happy or not) per type, number of UE(s) RAN node has received UE assistant information from, number of UE(s) RAN node has used UE assistant information received from, number of UE(s) RAN node has received UE assistant information from per each type, number of UE(s) RAN node has used UE assistant information received from per each type.

In a fourth example embodiment, a RAN node (e.g. BS) receives special QoS parameter for QoS flow from network (e.g. CN, Application Server). In some implementations of the fifth example embodiment, the special QoS parameter for QoS flow includes at least one of: indicator to indicate a QoS flow its QoS requirement is changed greatly over time, list of QoS parameter mostly to be used by a QoS flow. In some implementations of the fifth example embodiment, RAN node may map a QoS flow on a DRB group (list of DRB), according to the received special QoS parameter for QoS flow. In some implementations of the fifth example embodiment, the RAN node may quickly switch mapped DRB for a QoS flow (among mapped DRB group) when needed. In some implementations of the fifth example embodiment, network receives requirement and/or forecast for QoS flow from UE before sending the special QoS parameter for QoS flow to RAN node. In some implementations of the fifth example embodiment, the requirement and/or forecast for QoS flow is sent from UE to network directly (e.g. via NAS), or sent from UE to RAN node and forwarded to network.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:
1. A wireless communication method, comprising:
 transmitting, by a communication device, a mobility enhancement related information,
 wherein in response to an occurrence of a mobility failure when transitioning from a first base station to a second base station, the mobility enhancement related information includes at least one of:
  a Dual Active Protocol Stack (DAPS) related information,
  a Conditional Primary secondary cell group cell Addition or Change (CPAC) failure information, or
  a Conditional Handover (CHO) failure information, and
 wherein in response to an occurrence of a successful handover when transitioning from the first base station to the second base station, the mobility enhancement related information includes a successful handover related information,
 wherein the successful handover related information includes a two-step Random Access Channel (RACH)

related information that includes an indicator that indicates two-step RACH fallback to four-step RACH related to a beam.

2. The method of claim 1, wherein the DAPS related information includes at least one of a Packet Data Convergence Protocol (PDCP) type or an indication whether a maximum number of aggregated carriers are reached.

3. The method of claim 1, wherein the CHO failure information includes at least one of a CHO candidate cell identifier (ID) or a CHO failure cause.

4. The method of claim 1, wherein the successful handover related information includes a handover type.

5. The method of claim 1, wherein the CPAC failure information indicates whether a conditional Primary Secondary cell group Cell (PSCell) change is triggered by a master node or a secondary node.

6. The method of claim 1, wherein the CPAC failure information includes at least one of a source base station identifier, a target base station identifier, or a type of trigger node.

7. The method of claim 1, wherein the two-step RACH related information includes at least one of:
- indexes of tried beams and number of preambles sent on each tried beam listed in chronological order of attempts,
- contention detected indication per beam, or
- list of beam type selected in chronological order per RACH procedure.

8. The method of claim 7, wherein the beam type includes a synchronization signal block (SSB) and/or a channel state information reference signal (CSI-RS).

9. The method of claim 1,
- wherein the successful handover related information includes a contention detected indication per beam, wherein a contention detection indication for a beam is set as true in response to at least one failed contention resolution being detected on the beam, or
- wherein the successful handover related information includes an indication to indicate which type of beam is selected per RACH procedure.

10. The method of claim 1,
- wherein the successful handover related information includes indexes of tried beams and a number of preambles sent on each tried beam listed in chronological order of attempts, or
- wherein the indicator indicate the fallback between 2-step random access channel, RACH, and 4-step RACH per beam, wherein the indicator is set to true in response to the 2-step RACH fallback to the 4-step RACH at least once for a beam during a RACH procedure.

11. A wireless communication method, comprising:
receiving, by a network device, a mobility enhancement related information,
wherein in response to an occurrence of a mobility failure when transitioning from a first base station to a second base station, the mobility enhancement related information includes at least one of:
a Dual Active Protocol Stack (DAPS) related information,
a Conditional Primary secondary cell group cell Addition or Change (CPAC) failure information, or
a Conditional Handover (CHO) failure information, and
wherein in response to an occurrence of a successful handover when transitioning from the first base station to the second base station, the mobility enhancement related information includes a successful handover related information,
wherein the successful handover related information includes a two-step Random Access Channel (RACH) related information that includes an indicator that indicates two-step RACH fallback to four-step RACH related to a beam; and
finding a root cause of the mobility failure based on the mobility enhancement related information that is received.

12. The method of claim 11, wherein the DAPS related information includes at least one of a Packet Data Convergence Protocol (PDCP) type or an indication whether a maximum number of aggregated carriers are reached.

13. The method of claim 11, wherein the CHO failure information includes at least one of a CHO candidate cell identifier (ID) or a CHO failure cause.

14. The method of claim 11, wherein the successful handover related information includes a handover type.

15. The method of claim 11, wherein the CPAC failure information indicates whether a conditional Primary Secondary cell group Cell (PSCell) change is triggered by a master node or a secondary node.

16. The method of claim 11, wherein the CPAC failure information includes at least one of a source base station identifier, a target base station identifier, or a type of trigger node.

17. The method of claim 11, wherein the two-step RACH related information includes at least one of:
- indexes of tried beams and number of preambles sent on each tried beam listed in chronological order of attempts,
- contention detected indication per beam, or
- list of beam type selected in chronological order per RACH procedure.

18. The method of claim 17, wherein the beam type includes a synchronization signal block (SSB) and/or a channel state information reference signal (CSI-RS).

19. An apparatus for wireless communication, comprising a processor configured to:
transmit a mobility enhancement related information,
wherein in response to an occurrence of a mobility failure when transitioning from a first base station to a second base station, the mobility enhancement related information includes at least one of:
a Dual Active Protocol Stack (DAPS) related information,
a Conditional Primary secondary cell group cell Addition or Change (CPAC) failure information, or
a Conditional Handover (CHO) failure information, and
wherein in response to an occurrence of a successful handover when transitioning from the first base station to the second base station, the mobility enhancement related information includes a successful handover related information,
wherein the successful handover related information includes a two-step Random Access Channel (RACH) related information that includes an indicator that indicates two-step RACH fallback to four-step RACH related to a beam.

20. An apparatus for wireless communication, comprising a processor configured to:
receive a mobility enhancement related information,
wherein in response to an occurrence of a mobility failure when transitioning from a first base station to a second base station, the mobility enhancement related information includes at least one of:
a Dual Active Protocol Stack (DAPS) related information, a Conditional Primary secondary cell group cell Addition or Change (CPAC) failure information, or a Conditional Handover (CHO) failure information, and wherein in response to an occurrence of a successful handover when transitioning from the first base station to the second base station, the mobility enhancement related information includes a successful handover related information, wherein the successful handover related information includes a two-step Random Access Channel, RACH, related information that includes an indicator that indicates two-step RACH fallback to four-step RACH related to a beam; and finding a root cause of the mobility failure based on the mobility enhancement related information that is received.

\* \* \* \* \*